United States Patent
Williams et al.

(10) Patent No.: US 7,100,893 B2
(45) Date of Patent: Sep. 5, 2006

(54) GATE VALVE

(75) Inventors: Nicholas J. Williams, Sparks, NV (US); Christopher E. Cooper, Reno, NV (US); Lawrence J. Burrow, Reno, NV (US); Joanne L. Dickson, Sparks, NV (US)

(73) Assignee: Tyco Flow Control, Inc., Princeton, NJ (US)

( * ) Notice: Subject to any disclaimer, the term of this patent is extended or adjusted under 35 U.S.C. 154(b) by 705 days.

(21) Appl. No.: 09/941,475

(22) Filed: Aug. 29, 2001

(65) Prior Publication Data

US 2005/0285071 A1 Dec. 29, 2005

(51) Int. Cl.
*F16K 3/02* (2006.01)

(52) U.S. Cl. ..................................... 251/328

(58) Field of Classification Search ................ 251/326, 251/327, 328, 329; 137/454.2, 454.4, 454.6, 137/454.5; 264/41, 328.1, 328.8
See application file for complete search history.

(56) References Cited

U.S. PATENT DOCUMENTS

| | | | |
|---|---|---|---|
| 2,942,841 A | * | 6/1960 | Stillwagon .................. 251/326 |
| 3,844,531 A | * | 10/1974 | Grengs ........................ 251/327 |
| 4,009,727 A | | 3/1977 | Bailey |
| 4,112,969 A | | 9/1978 | Still |
| 4,646,407 A | | 3/1987 | Mayhew, Jr. |
| 4,773,627 A | * | 9/1988 | King et al. .................. 251/328 |
| 4,798,365 A | * | 1/1989 | Mayhew ..................... 251/326 |
| 4,881,719 A | | 11/1989 | Bowman |
| 5,014,730 A | | 5/1991 | Fye |
| 5,223,202 A | | 6/1993 | Hall |
| 5,338,006 A | * | 8/1994 | McCutcheon et al. ...... 251/327 |
| 5,464,035 A | * | 11/1995 | Heinecke .................... 251/328 |

* cited by examiner

*Primary Examiner*—Eric Keasel

(57) ABSTRACT

A gate valve having a polymeric monolithic liner, the liner having cylindrical flange portions projecting from either side to form a fluid passageway through the liner, first and second housing portions forming a liner cavity, the liner being disposed in the liner cavity, a first face ring having a first cylindrical tubular portion and a first radially outwardly projecting, annularly extending face ring flange, the first tubular portion being received in the first annular flange portion of the liner, a second face ring having a second cylindrical tubular portion and a second radially outwardly projecting, annularly extending face ring flange, the second tubular portion being received in the second annular flange portion and a gate valve element slidably received in a valve element cavity formed in the liner.

10 Claims, 5 Drawing Sheets

FIG. 2
FIG. 3
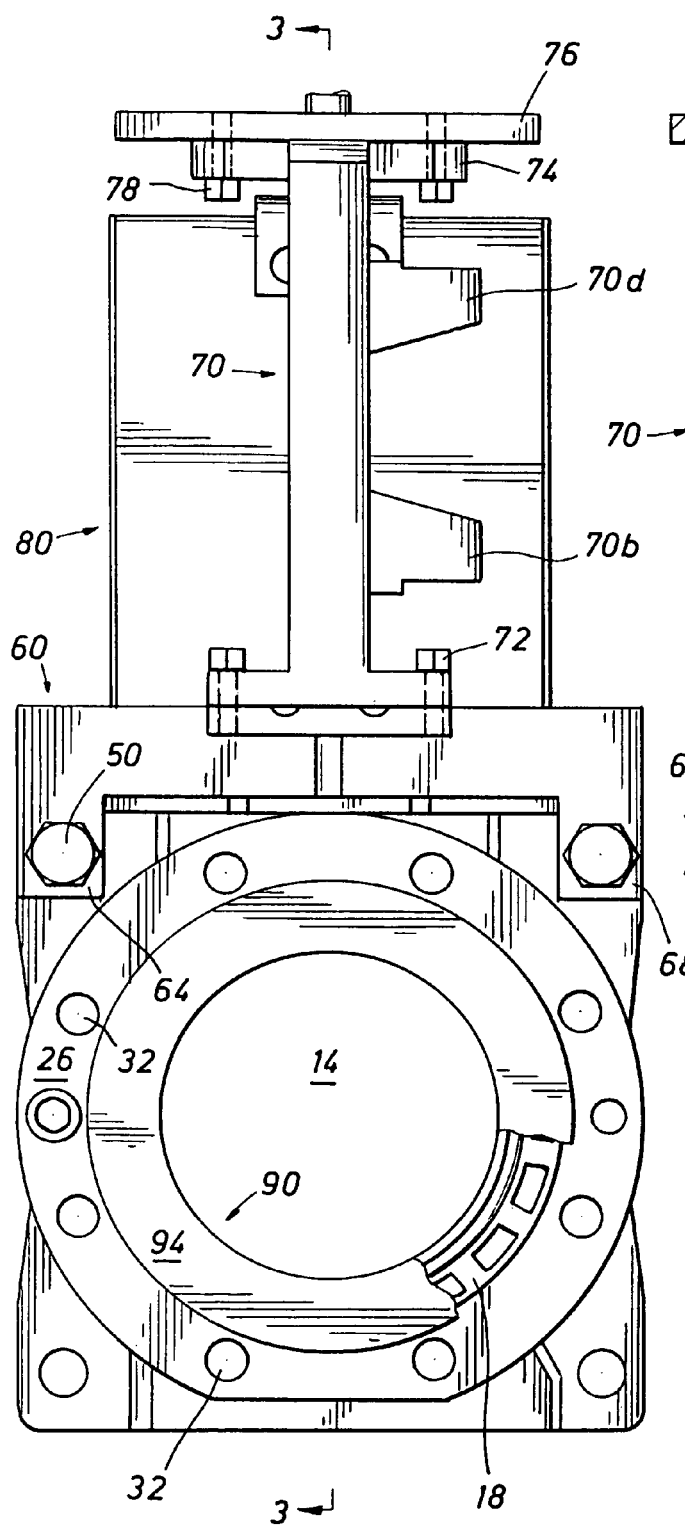
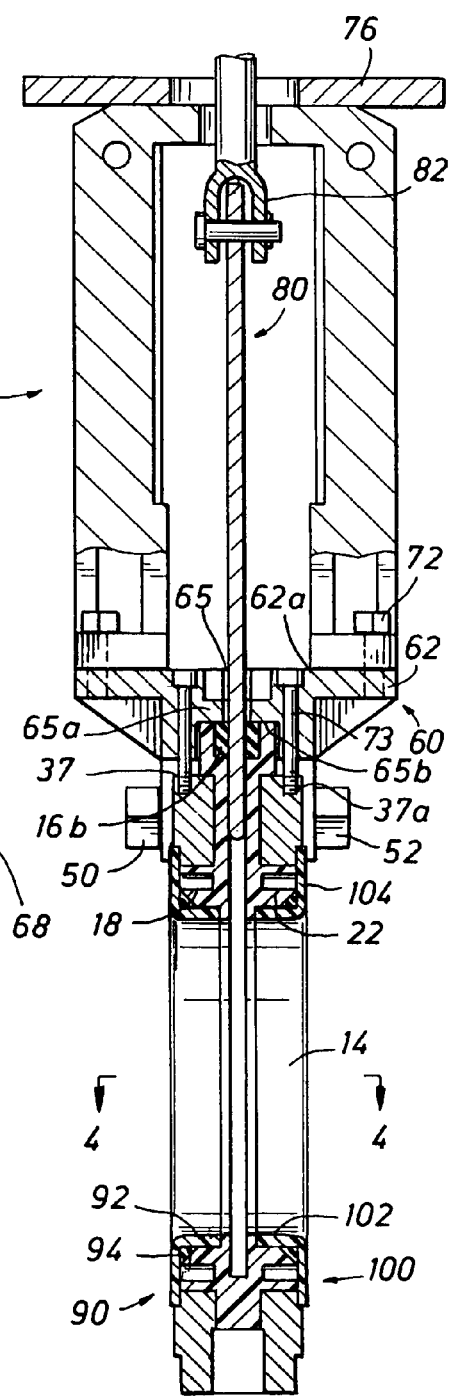

GATE VALVE

BACKGROUND OF THE INVENTION

1. Field of the Invention

The present invention relates to gates valves, particularly gate valves having a monolithic, polymeric liner.

Description of the Prior Art

Early gate valve construction involved a gate valve body machined from a single-piece casting, the single-piece casting forming a gate cavity in which a gate valve element was slidably disposed. In cases where the gate valve was used to handle corrosive products, it was common, and indeed necessary, to employ polymeric liners in the body in order to prevent damage to the castings. Examples of such corrosion-resistant valves employing polymeric liners are disclosed in U.S. Pat. No. 4,646,407 and patents cited therein. As taught in the prior art, the liners could be formed either by an in situ process using a one-piece valve body, such as disclosed in U.S. Pat. No. 4,646,407. Alternatively, as disclosed in U.S. Pat. No. 4,112,969, a one-piece liner could be molded separately from the valve body housing, the valve body housing being made of body halves that cooperate to form a cavity for the molded liner.

Gate valves having knife-type valve elements are frequently used to control the flow of slurries or similar solid liquid mixtures that, perhaps in addition to being corrosive, are abrasive and accordingly can cause excessive wearing of the polymeric liner. Accordingly, there remains a need for a gate valve having a monolithic corrosion-resistant liner wherein the liner is exposed to minimal contact with any abrasive material flowing through the valve.

SUMMARY OF THE INVENTION

It is therefore an object of the present invention to provide a gate valve having a replaceable monolithic liner.

Another object of the present invention is to provide a gate valve having a one-piece replaceable liner wherein there is minimized contact between the fluidized media flowing through the valve and the liner surfaces.

Still another object of the present invention is to provide a gate valve having a one-piece liner and replaceable, relatively inexpensive face rings that minimize wear on the liner from abrasive media flowing through the valve.

Yet another object of the present invention is to provide a gate valve having a monolithic liner wherein compressive loads created by adjacent pipe flanges between which the valve is positioned are not directly absorbed by the monolithic liner.

Yet a further object of the present invention is to provide a gate valve having face rings providing annular flanges that can seal against a variety of different pipe flange systems.

Another object of the present invention is to provide a method for forming a monolithic liner for use in a gate valve.

The above and other objects of the present invention will be apparent from the drawings, the description given herein, and the appended claims.

According to the present invention, there is provided a gate valve having a polymeric, monolithic liner defining a valve element cavity. The liner has a first side, a second side, a first cylindrical flange portion projecting outwardly from the first side and a second cylindrical flange portion projecting outwardly from the second side. The first and second cylindrical flanges define a fluid passageway through the liner transverse to the valve element cavity. The gate valve further comprises a housing comprised of a first housing portion having a first front face, a first back face, and a first throughbore for receiving the first annular flange portion and a second housing portion having a second front face, a second back face, and a second throughbore for receiving the second annular flange portion. A liner cavity is formed between the back faces of the housing portions, the liner being positioned in the liner cavity. A first face ring having a first cylindrical tubular portion and a first radially outwardly projecting, annularly extending face ring flange has the first tubular portion received in the first annular flange portion. A second face ring having a second cylindrical tubular portion and a second radially outwardly projecting, annularly extending face ring flange has the second tubular portion received in the second annular flange portion. A gate valve element is slidably received in the gate valve element cavity. Preferably, this is also a connector assembly that connects the first and second housing portions together.

BRIEF DESCRIPTION OF THE DRAWINGS

FIG. 2 is an elevational view of one face of the gate valve of the present invention;

FIG. 3 is a view taken along the lines 3—3 of FIG. 2;

DETAILED DESCRIPTION OF THE PREFERRED EMBODIMENTS

Figure 1:
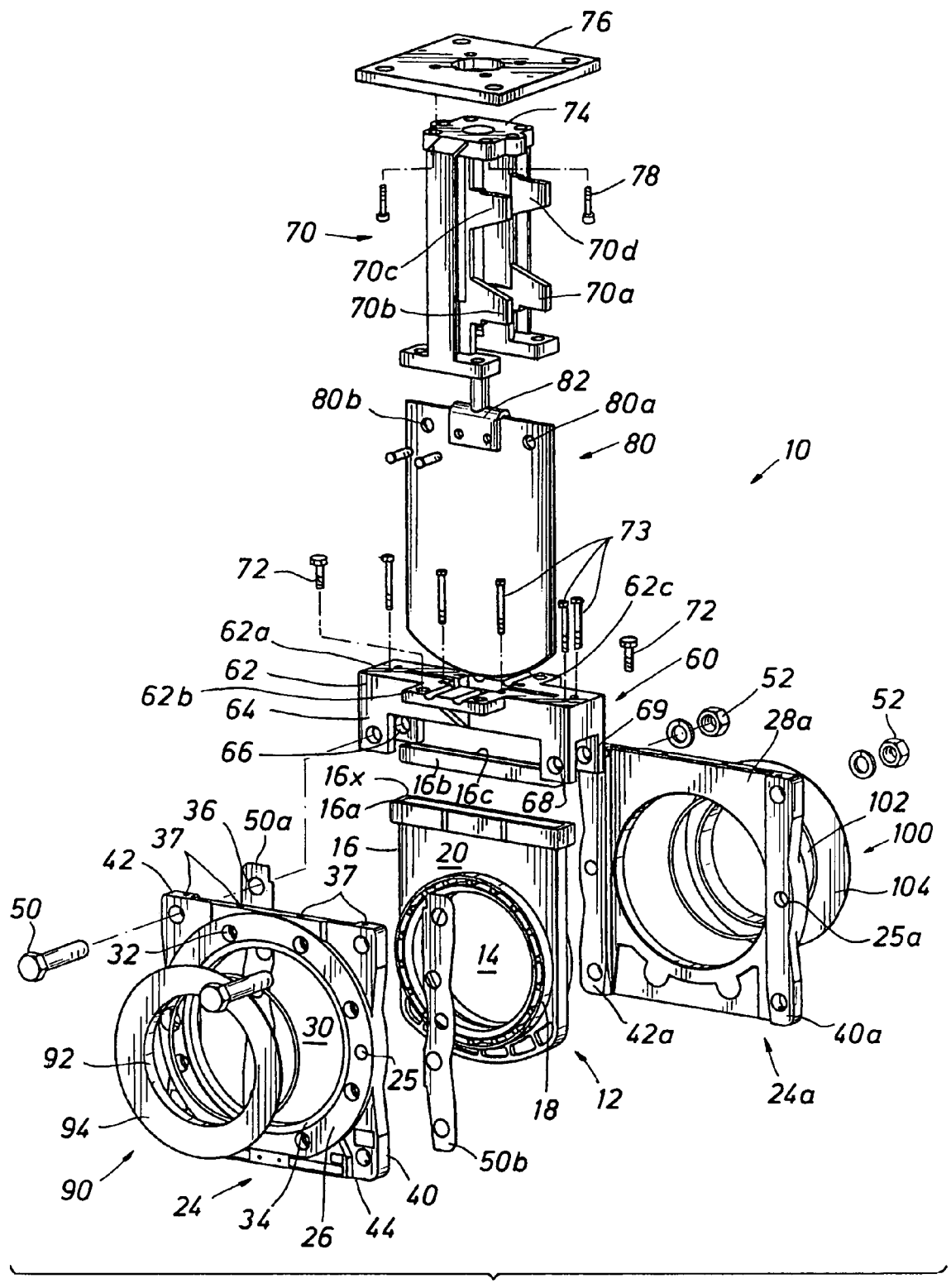
FIG. 1 is an exploded view of the gate valve of the present invention.

While the gate valve of the present invention finds particular application to gate valves of the knife gate variety, it is to be understood that the invention is not so limited and is applicable to any gate valve construction. With reference then to FIG. 1, the components of the gate valve of the present invention are shown in an exploded view. The gate valve, shown generally as 10, comprises a liner 12 having a fluid passageway 14. Liner 12 has a chest portion 16 with first and second sides, a first cylindrical flange portion 18 projecting from first side 20 of liner 12 and a second cylindrical annular flange portion 22 projecting from the second, opposite side (not shown) of liner 12. Liner 12 further includes an upper open box-shaped end 16a that has an upper peripheral edge 16x, box end 16a forming a seal pocket for a purpose hereinafter described. A valve element cavity 12x (see FIG. 5) extends into liner 12 for receipt of the gate valve element. An elastomeric seal 16b having a generally rectangular opening 16c is adapted to be received in the seal pocket formed in upper open end 16a of liner 12.

Valve 10 further comprises a first housing portion 24 having a front face 26, a back face (not shown), and a throughbore 30. The front face 26 is provided with threaded bores 32 to permit valve 10 to be connected to a pipe flange in the well-known fashion. Formed in front face 26 is an annular recess 34, recess 34 being in surrounding relationship to throughbore 30. Housing portion 24 has a top edge 36 provided with a series of four threaded bores 37 and side edges 38 and 40. Projecting from the back face adjacent side edge 38 is a longitudinally extending rib 42, rib 42 extending from top edge 36 to bottom edge 44 of housing portion 24.

In like manner, a rib 46 extends from back face 28 adjacent side edge 40, rib 46 extending from top edge 36 to bottom edge 44.

Gate valve 10 further includes a second housing portion 24a that is a mirror image of housing portion 24 and will be described with the same reference numerals followed by the letter "a" in the description that follows hereinafter. It can be seen that when housing portions 24 and 24a are secured together as, for example, by means of bolt/nut combinations 50/52, there will be formed a liner cavity defined by ribs 42, 46, 42a, and 46a and back face 28a of housing portion 24a and the back face (not shown) of housing portion 24. Gasket 50a is disposed between ribs 42 and 42a while gasket 50b is disposed between ribs 46 and 46a. It will be understood that gaskets 50a and 50b serve as backup to prevent leakage from the liner cavity in the event the liner 12 should fail, permitting fluid to spill into the liner cavity. In this regard, while not shown, there is a blanking plate that is affixed to the bottom edges of housing portions 24 and 24a, which also prevents the loss of fluid from the liner cavity in the event of failure of the liner 12.

A yoke adapter, shown generally as 60, comprises a body portion 62 having a top surface 62a. Extending from body 62 of yoke adapter 60 are mounting pads 62b and 62c. Yoke adapter 60 is also provided with a series of downwardly depending legs 64, 66, 68, and 69, located generally at the corners of yoke adapter 60. Legs 64 and 66 define a first U-shaped opening while legs 68 and 69 define a second, spaced U-shaped opening. A series of screws 73 are used, as described hereinafter, to secure yoke adapter in the assembled valve. A yoke, shown generally as 70, is adapted to be secured to flanges 62b and 62c on yoke adapter 60 by means of screws 72. Yoke 70 has a top surface 74 upon which can be secured a mounting plate 76 by means of screws 78. There may be occasions when it is desired to lock the gate valve element 80 either in the closed position or in the open position. To this end, yoke 70 is provided with lower, laterally outwardly extending projections 70a and 70b and upper, laterally outwardly extending projections 70c and 70d. It will be understood that when valve 10 is assembled and gate 80 is in the closed position, preventing flow through flow passage 14; and if it is desired that gate valve element 80 remain in that position, pins can be inserted in holes 80a and 80b in gate valve element 80 such that any attempted upward movement of gate valve element 80 will be stopped by the engagement of the pins with lower projections 70a and 70b. In like manner, and assuming gate valve element 80 is in the up, open position, pins could again be inserted in holes 80a and 80b such that any attempted downward movement of valve element 80 to move it to the closed position would be prevented by projections 70c and 70d. As is well-known to those skilled in the art, projections 70a–70d are commonly referred to as "lockouts."

The gate valve element is provided with a clevis assembly 82 that can be attached to a suitable actuating mechanism that can be secured to mounting plate 76 to reciprocally move gate valve element 80 in and out of liner 12 to control flow through fluid passageway 14.

A face plate, shown generally as 90, has a cylindrical tubular portion 92 and a radially outwardly projecting, annularly extending face ring flange 94, tubular portion 92 being received in annular flange portion 18. A second face plate 100 has a cylindrical tubular portion 102 and a radially outwardly projecting, annularly extending face ring 104, tubular portion 102 being received in cylindrical flange portion 22.

Figure 4:
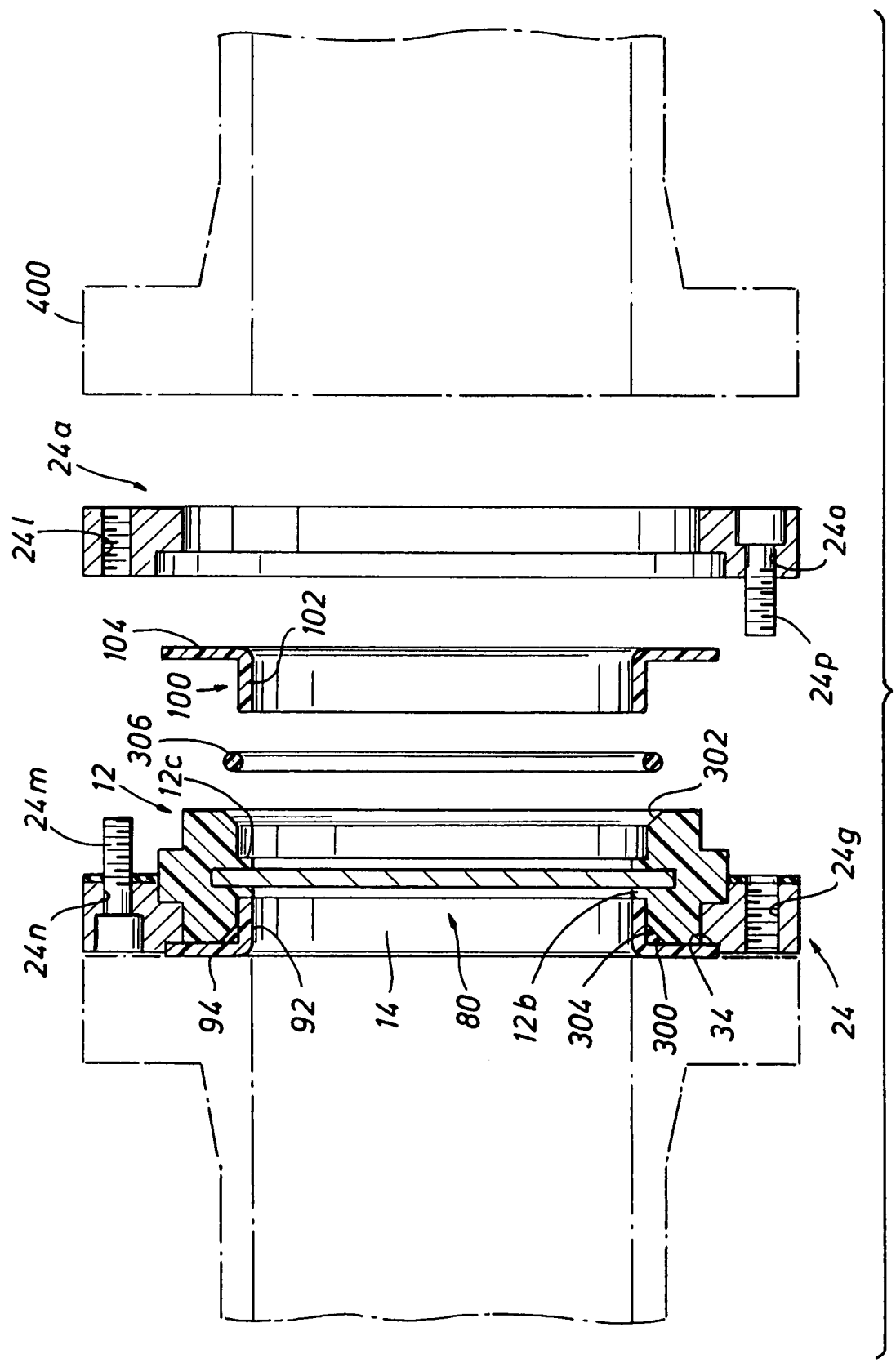
FIG. 4 is a view, exploded, taken along the lines 4—4 of FIG. 3 and showing connecting pipe flanges in phantom.

With reference now to FIGS. 2, 3, and 4, valve 10 is shown in assembled form. With particular reference to FIG. 3, it can be seen that when housing portions 24 and 24a are connected by bolt/nut assemblies 50/52, liner 12 is received in the liner cavity formed by housing portions 24 and 24a. As can also be seen in FIG. 3, in the assembled condition, face ring 90 has tubular portion 92 received in cylindrical flange portion 20. More specifically, the OD of tubular portion 92 is substantially the same as the ID of cylindrical flange portion 20. As can also be seen, face ring flange 94 is received in the annular recess 34 in the front face 26 of housing portion 24. A like situation applies with respect to face ring 100 in that tubular portion 102 is received in cylindrical flange portion 22 while annular flange 104 is received in a recess in the front face of housing portion 24a, similar to recess 34 in the front face 26 of housing portion 24.

With reference now to FIG. 4, there is shown a more detailed view of the cooperation between face rings 90, 100 and liner 12. With reference to the left side of FIG. 4, the valve 10 is shown abutting a pipe flange shown in phantom as 200. It will be understood by those skilled in the art that bolts will be received through bores in pipe flange 200 and received in threaded bores 32, 32a in housing portions 24, 24a, respectively. In addition to bolt/nut combinations 50 and 52 holding housing portions 24 and 24a together, the housing portion 24 has a bore 24n that is countersunk, as shown, to receive the head, e.g., the hex head, of a bolt 24m. As can be seen, bolt 24m has a threaded shank that is received in a threaded bore 24l in housing portion 24a. In like fashion, body portion 24a has a countersunk bore 24o through which is received a bolt 24p, the threaded end of bolt 24p being received in threaded bore 24q of housing portion 24. As best seen with reference to FIG. 1, the bolts 24m and 24p are generally positioned at three o'clock and nine o'clock with respect to the front faces of the housing portions 24 and 24a.

As can be seen, the cylindrical tubular portion 92 of face plate 90 is received in cylindrical flange portion 18 of liner 12. When assembled, and as shown on the left side of FIG. 4, the flange portion 94 of face plate 90 is received in the annular recess 34 of housing portion 24. Face ring flange 94 has an axial thickness that is slightly greater than the axial depth of annular recess 34. Accordingly, when assembled, the face flange ring 94 will project slightly outwardly of the front face 26 of housing portion 24. In effect, when assembled between the pipe flanges, e.g., pipe flange 200, flange 94 forms a sealing surface with the face of pipe flange 200. It will be appreciated that because of its radial width, flange 94 can accommodate a wide variety of pipe flange dimensions. Of course, a like description applies to the cooperation of face ring 100 and liner 12.

Liner 12 has a first radially inwardly projecting, annularly extending lip 12b and a second, axially spaced, radially inwardly projecting, annularly extending lip 12c, lips 12b and 12c partially forming the valve element cavity 12x. As can also be seen, lips 12b and 12c form surfaces against which abut the ends of cylindrical tubular portion 92 and 92a distal flanges 94 and 94a, respectively. In a desired embodiment, the axial length of the cylindrical tubular portions 92 and 92a is controlled such that the contact pressure exerted on the annular lips 12b and 12c, respectively, is maintained at a desired level, regardless of the type of pipe flanging system between which valve 10 is clamped. Cylindrical flange portion 22 and cylindrical flange portion 18 are formed with chamfered surfaces 300 and 302. An annular chamfered surface 300 cooperates with cylindrical tubular portion 92 and flange 94 to effectively form an annular relief for receipt of an elastomeric seal ring 304 while an annular chamfered surface 302 cooperates with cylindrical tubular portion 92a and flange 94a to form an annular relief for receipt of an annular elastomeric seal ring 306. It will thus be seen that when valve 10 is in the fully assembled position—i.e., when valve 10 is clamped between pipe flanges 200 and 400—the only portion of liner 12 that will be exposed to fluid flowing through valve 10 will be the radially inwardly facing, annularly extending surfaces of lips 12b and 12c. In other words, the tubular portion 92 and 102 of face rings 90 and 100 essentially form the flowpath through the valve 10 such that any wear due to the abrasive nature of any medium flowing through the valve is imparted to the inner surface of the tubular portion 92 and 102 of face rings 90 and 100, respectively. Since faces rings 90 and 100 can be easily replaced without having to disassemble the valve 10 or remove it from the pipeline, repair of valve 10 can be easily accomplished. Since face rings 90 and 100 absorb virtually all abrasive and erosive effects, for all intents and purposes, the liner 12 can be considered to have an indefinite lifetime.

Figure 5:
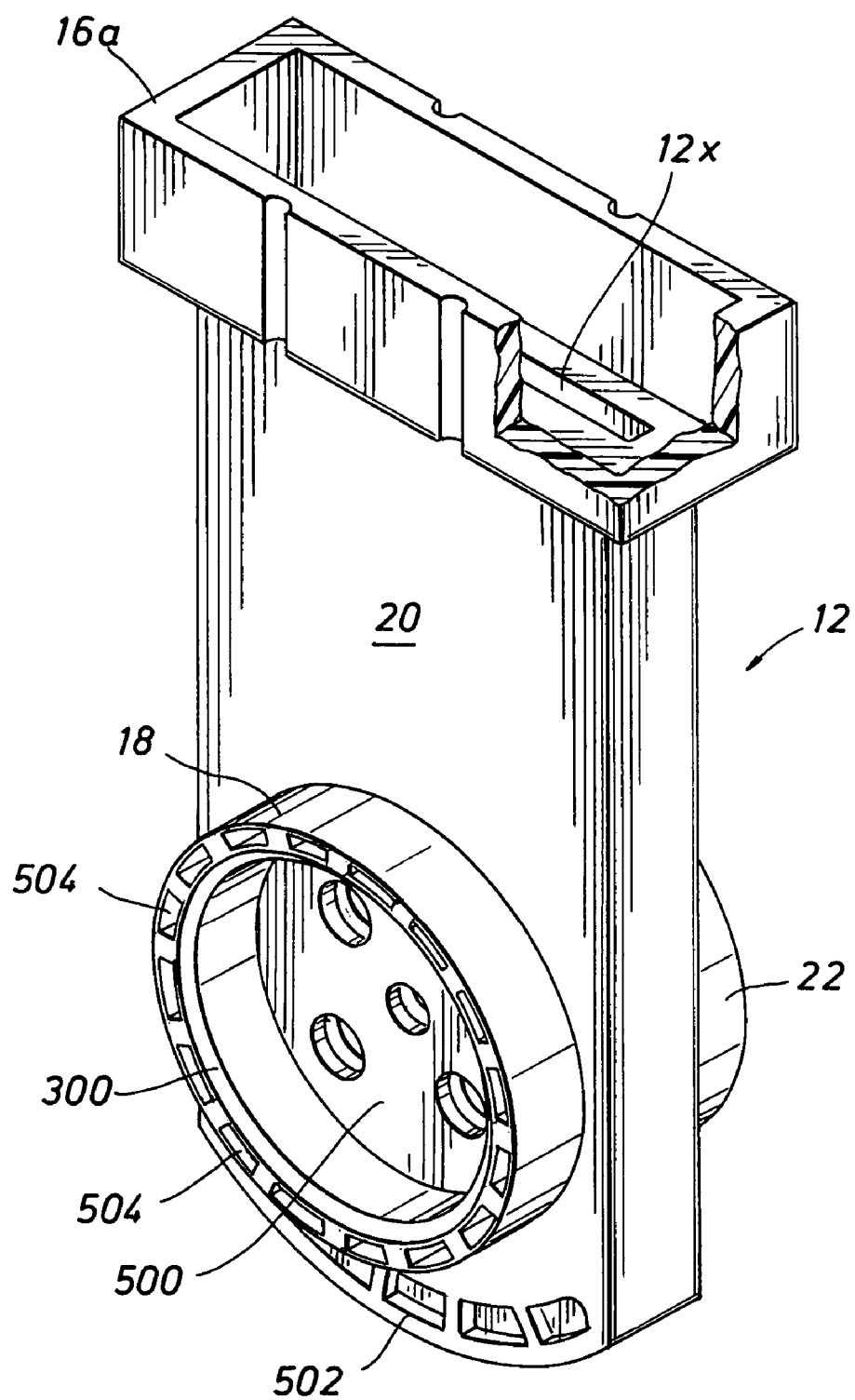
FIG. 5 is an isometric view, with a portion cut away, showing the monolithic liner used in the gate valve of the present invention.

Reference is now made to FIG. 5, which shows in greater detail the construction of the liner 12. As shown in FIG. 5, liner 12 is shown as having just been removed from the mold and accordingly does not have a fluid passageway 14 therethrough. In order to form the passageway 14, a portion 500 of the polymeric material disposed at the inner end of cylindrical flange portion 18 would be removed to the extent to leave the lip 12b. In like fashion, a portion of the polymeric material corresponding to portion 500 would be removed from cylindrical flange portion 22 to leave lip 12c. Liner 12 is also provided with a series of reliefs 502, which serve to reduce the amount of material, reduce the weight of liner 12, and aid in preventing shrinking and distortion of liner 12. In like fashion, the cylindrical flange portions 18 and 22 are provided with a series of circumferentially spaced reliefs 504 that serve to maintain the uniformity of the diameter of cylindrical flange portions 18 and 28.

Yoke adapter 60 is slotted, as at 65, for passage of gate valve element 80. Slot 65 extends through a longitudinally extending rib 65a, rib 65a having a surface 65b that abuts the upper end surface 16x of box-shaped end 16a. More specifically, elastomeric seal 16b is sized such that when yoke adapter 60 is secured to body halves 24, 24a by means of screws 73 received in bores 37, 37a, seal 16a is placed under a predetermined amount of compression. This ensures that seal 16a snugly engages gate valve element 80. It will be understood that seal 16b can be preloaded to a desired amount, depending upon the sizing of seal ring 16b and the amount of tightening of screws 73.

Figure 6:
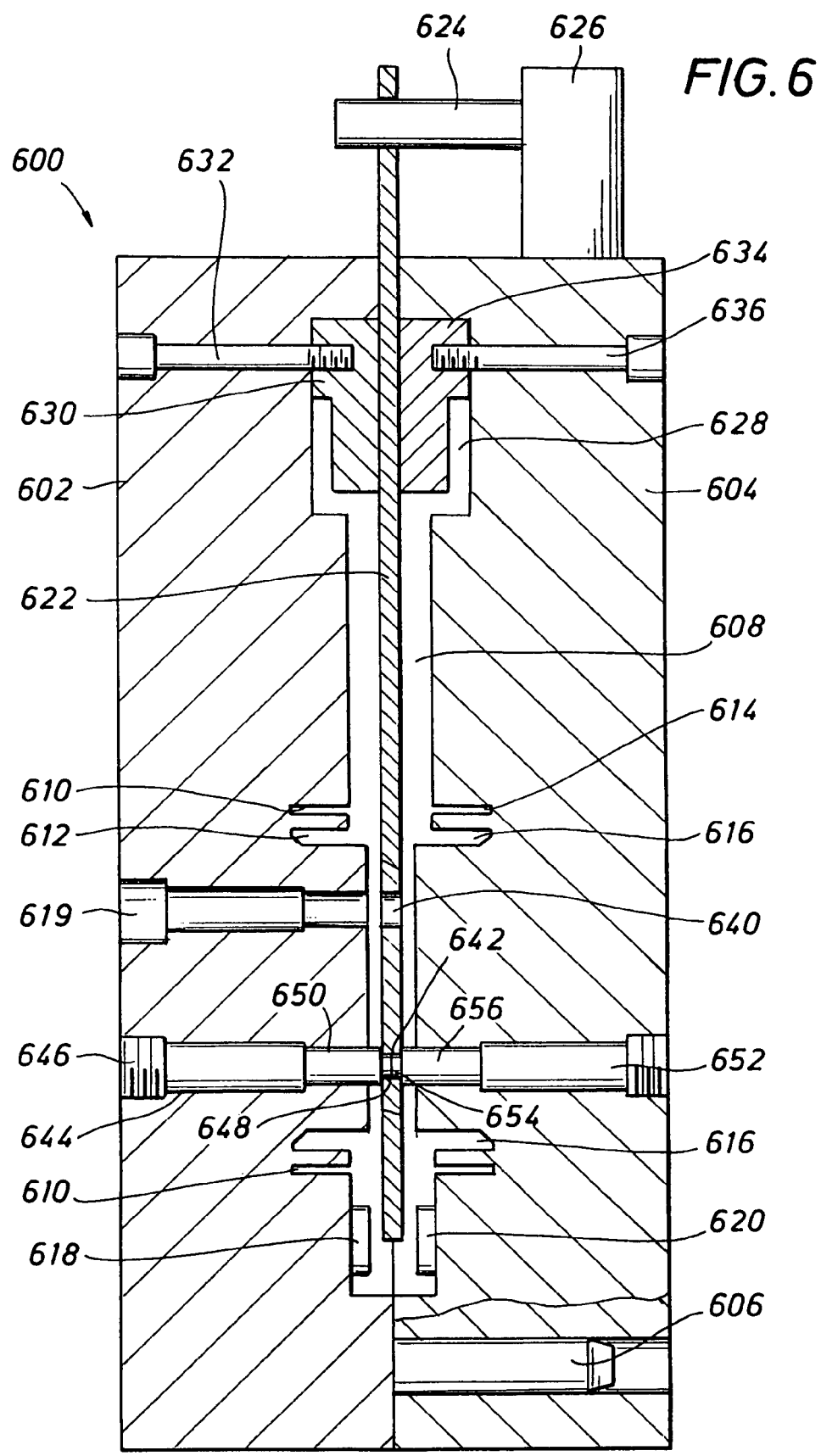
FIG. 6 is a cross-sectional view of a mold used to make the liner for use in the gate valve of the present invention.

With reference now to FIG. 6, there is shown a mold assembly for forming a liner insert 12. The mold assembly, shown generally as 600, includes a first mold half 602 and a second mold half 604. To properly align the two mold halves 602 and 604 with respect to one another, there are a series of aligning pins, one of which is shown as 606, that are received in registering bores in mold halves 602 and 604. It can be seen that when mold halves 602 and 604 are connected in the well-known manner, there is formed a mold cavity 608. Formed in mold half 602 and in communication with mold cavity 608 is a series of circumferentially spaced reliefs 610 and 612, reliefs 610 and 612 being generally concentrically disposed with respect to one another. In like fashion, there is a series of circumferentially spaced reliefs 614 and 616 formed in mold half 604. Mold half 602 is further provided with a series of spaced protrusions 618 that project into mold cavity 608 while mold half 604 is provided with a series of like protrusions 620. Suspended in mold cavity 608 is a dummy gate valve element 622. Gate element 622 is suspended by means of a rod 624 attached to a support 626 suitably secured to mold half 604. Mold cavity 608 has an enlarged upper portion 628 that is generally rectangular when viewed in cross-section. Disposed in portion 628 of mold cavity 608 is a block 630 that is generally L-shaped when viewed in transverse cross-section. Block 630 is held in place by a pin 632 extending through a bore in mold half 602. In like fashion, a similar block 634 is positioned in the mold cavity portion 628 by means of a pin 636 received in a bore in mold half 604. Blocks 630 and 634 are compressed against gate element 622. Dummy gate valve element 622 is provided with a throughbore 640 that is in register with an injection port 619 in mold half 602. Dummy gate valve element 622 also has a hole 642. Extending through a bore 644 in mold half 602 is a positioning pin 646 having a reduced diameter axial extension 648 and an enlarged diameter portion 650, an annular shoulder being formed between projection 648 and enlarged portion 650. In like fashion, there is a positioning pin 652 having an axial projection 654 and an enlarged diameter portion 656 forming an annular shoulder therebetween. Since, when dummy gate valve element 622 is disposed in the mold cavity 608, the bores in which positioning pins 646 and 652 are received are in register with the hole 642 in dummy gate valve element 622. Accordingly, when the pins 646 and 652 are positioned in mold halves 602 and 604, the axial projections 648 and 654 will be received in the hole 642 while the annular shoulders will abut the opposite sides of the dummy gate valve element 622. This ensures that gate valve element 622 is properly positioned in mold cavity 608. It will thus be seen that when polymeric material is injected through injection port 619, it will flow through hole 642, filling the mold cavity 608 on both sides of dummy gate valve element 622. Additionally, the polymeric material will flow into the reliefs 610, 612, 614, and 616. Once the polymeric material has set, the mold halves 602 and 604 are separated and the liner blank removed, the liner blank having the appearance as shown in FIG. 5.

The term "polymeric material" as used herein and with respect to the materials of construction of the liner and the face rings is intended to have its broadest possible meaning. Accordingly, the polymeric material can be thermosetting or thermoplastic in nature, depending on the end use to which the valve 10 is put. Non-limiting examples of polymeric materials that can be employed include polyurethanes, fluorocarbon resins, polyolefins, epoxies, polyesters, etc. Indeed, virtually any polymeric or resinous material that can be used in injection molding can be employed in forming the liner 12 and face plates 90 and 100 used in the gate valve of the present invention. It will also be appreciated that the polymeric or resinous materials can include fillers to impart strength and abrasion resistance. Such fillers can include particulate, as well as fibrous, materials, the only requirement being, as noted, that the filled polymeric or resinous material be suitable for injection molding.

The foregoing description and examples illustrate selected embodiments of the present invention. In light thereof, variations and modifications will be suggested to one skilled in the art, all of which are in the spirit and purview of this invention.

The invention claimed is:

1. A gate valve comprising:
   a polymeric monolithic liner defining a valve element cavity, the liner having a first side, a second side, a first cylindrical flange portion projecting outwardly from said first side, and a second cylindrical flange portion projecting outwardly from said second side, said first and second cylindrical flange portions defining a fluid passageway through said liner transverse to said valve element cavity, said liner having an upper open end forming an entrance into said valve element cavity, said upper open end of said liner defining a seal pocket;

a first housing portion having a first front face, a first back face, and a first throughbore for receiving said first annular flange portion;

a second housing portion having a second front face, a second back face, and a second throughbore for receiving said second annular flange portion, a liner cavity being formed between the back faces of said first and second housing portions;

a yoke adapter, said yoke adapter having a body forming a top surface and bottom surface, a slot extending through said top and bottom surfaces, said yoke adapter being secured to said housing portions, said bottom surface of said body overlying said seal pocket;

a first face ring, said first face ring including a first cylindrical tubular portion and a first radially outwardly projecting, annularly extending face ring flange, said first tubular portion being received in said first annular portion;

a second face ring, said second face ring including a second cylindrical tubular portion and a second radially outwardly projecting, annularly extending face ring flange, said second tubular portion being received in said second annular flange portion;

a gate valve element slidably received in said valve element cavity;

an elastomeric seal received in said seal pocket in surrounding relationship to said gate valve element, said elastomeric seal being sized such that when said yoke adapter is secured to said first and second housing portions, said elastomeric seal is placed under a predetermined amount of compression to snugly engage said gate valve element.

2. The gate valve of claim 1 wherein said liner has a first radially inwardly projecting, annularly extending lip and a second, axially spaced radially inwardly projecting, annularly extending lip, said first tubular portion of said first face ring having an axially innermost end, said axially innermost end of said first face ring abutting said first lip, said second tubular portion of said second face ring having an axially innermost end, said axially innermost end of said second face ring abutting said second lip.

3. The gate valve of claim 2 wherein said first housing portion has a first annular recess in said first front face in surrounding relationship to said first throughbore, said first face ring flange being received in said first recess and said second housing portion has a second annular recess in said second front face in surrounding relationship to said second throughbore, said second face ring flange being received in said second recess.

4. The gate valve of claim 3 wherein said first and second recesses have a depth that is less than the axial thickness of said first and second face ring flanges.

5. The gate valve of claim 2 wherein said first lip is formed adjacent said valve element cavity and said second lip is formed adjacent said valve element cavity.

6. The gate valve of claim 1 including a connector assembly connecting said first and second housing portions together.

7. The gate valve of claim 6 wherein said connector assembly includes compressive fasteners urging said first and second housing portions toward one another.

8. The gate valve of claim 1 wherein said top surface of said body of said yoke adapter forms a mounting surface and there is a yoke secured to said mounting surface.

9. The gate valve of claim 1 wherein there is a first annular elastomeric seal ring disposed between said first face ring and said first annular flange portion on said liner and a second annular elastomeric seal ring disposed between said second face ring and said second annular flange portion on said liner.

10. A method of forming a liner for a gate valve comprising:

providing a mold having first and second mold halves, said first and second mold halves defining a liner cavity, at least one of said first and second mold halves having an injection port for injection of a polymeric material;

disposing a dummy gate valve element in said cavity, said dummy gate valve element having a first side, a second side, and at least one positioning hole through said first and second sides and a passageway through said first and second sides, said first and second mold halves each having at least one positioning bore;

disposing a first positioning pin in said at least one positioning bore in said first mold half, said first positioning pin having a first axially extending projection received in said at least one positioning hole and a first annular shoulder abutting said first side of said dummy gate valve element;

disposing a second positioning pin in said at least one positioning bore in said second mold half, said second positioning pin having a first axially extending projection received in said at least one positioning hole and an annular shoulder abutting said second side of said dummy gate valve element, said first and second positioning pins being compressively urged toward one another to hold said dummy gate valve element in a predetermined position in said cavity whereby said passageway in said dummy gate valve element is in register with said injection port in said at least one of said first and second mold halves;

injecting a polymeric material into said cavity through said injection port;

allowing said polymeric material to set to form a liner blank;

removing said first and second positioning pins;

disassembling said mold halves;

removing said liner blank; and forming a flowpath through said liner blank.

* * * * *